June 7, 1932.    C. S. JENNINGS    1,861,964
PNEUMATIC DISPATCH SYSTEM
Filed Aug. 2, 1930    6 Sheets-Sheet 1
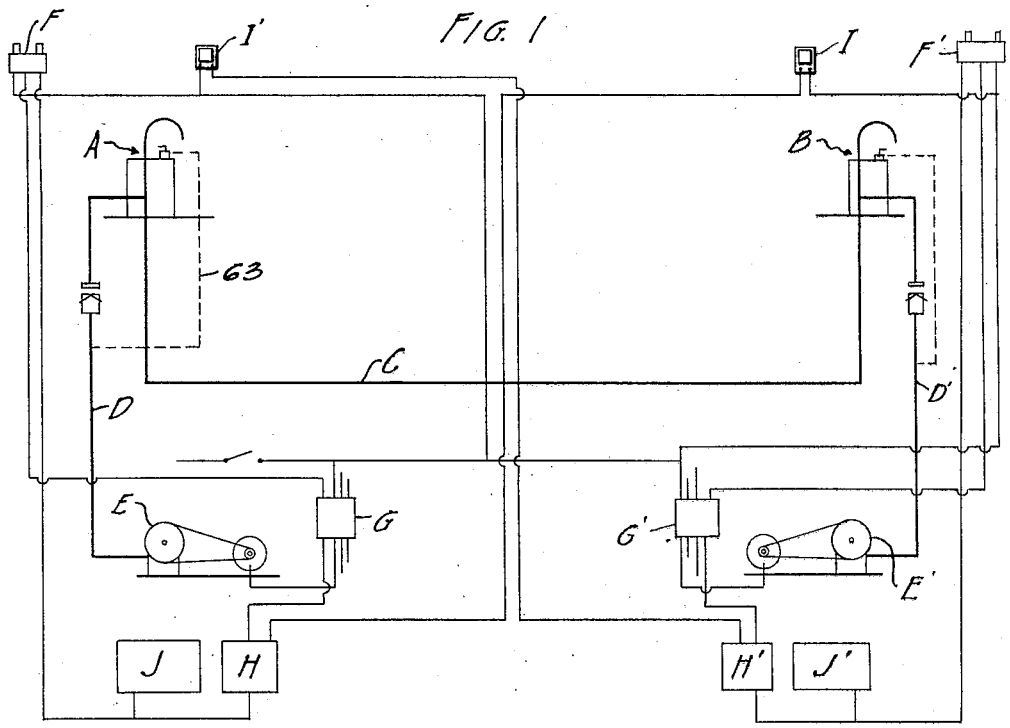
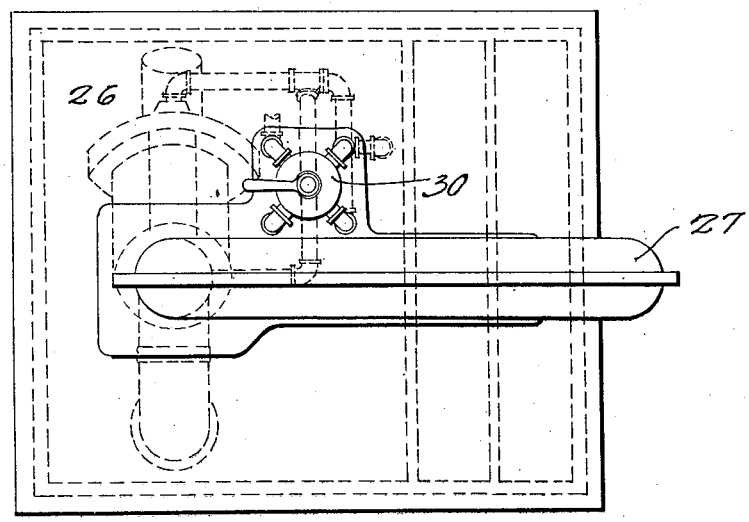
INVENTOR
CHESTER S. JENNINGS
by Roberts, Cushman & Woodbury
ATT'YS June 7, 1932.  C. S. JENNINGS  1,861,964
PNEUMATIC DISPATCH SYSTEM
Filed Aug. 2, 1930   6 Sheets-Sheet 2
FIG. 2
FIG. 3
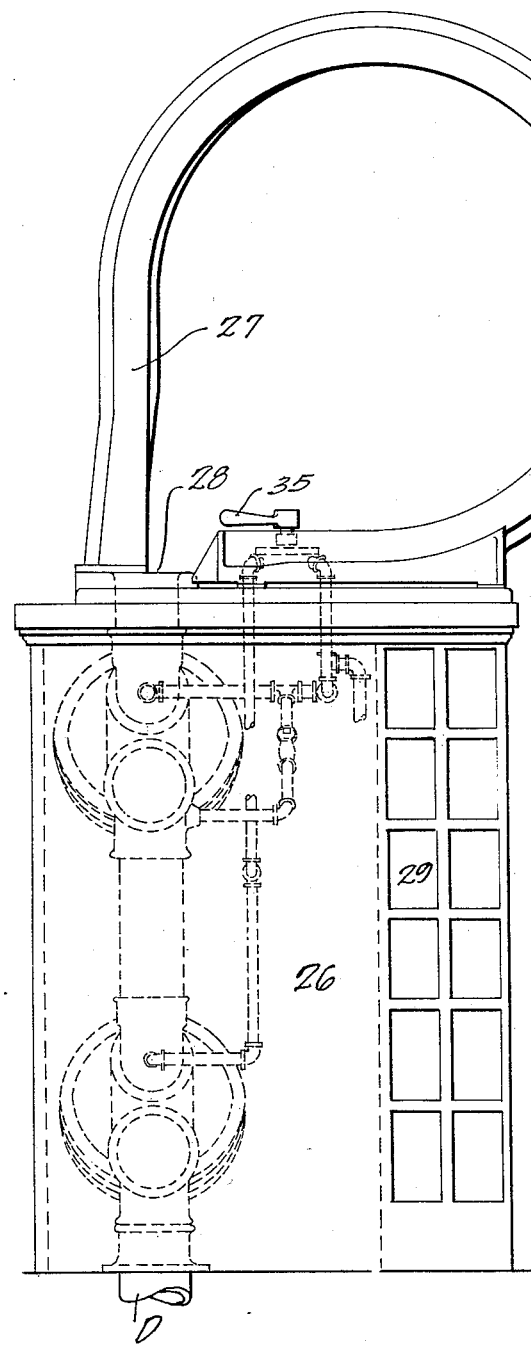
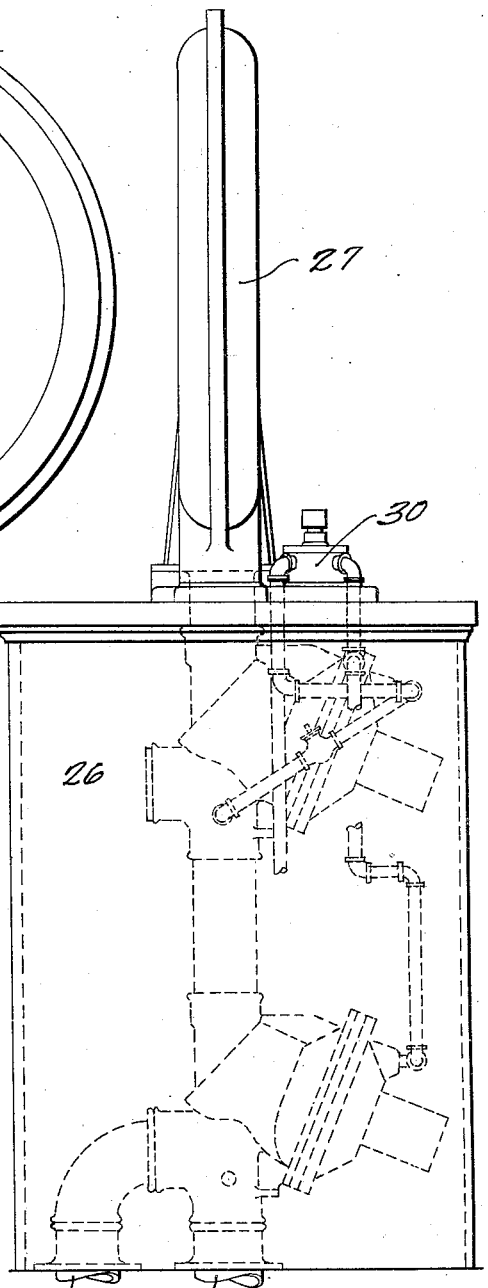
INVENTOR
CHESTER S. JENNINGS
by Roberts, Cushman & Woodbury
ATT'YS

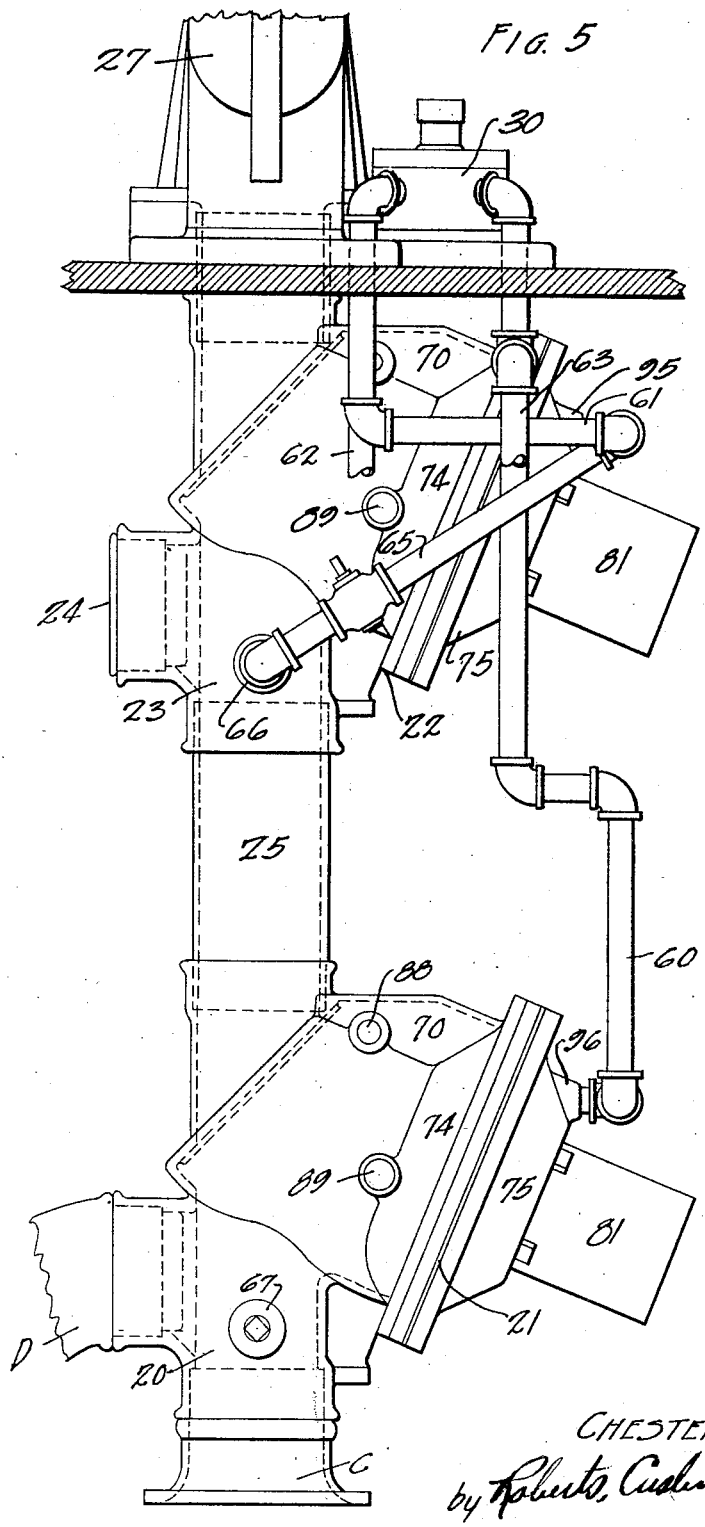

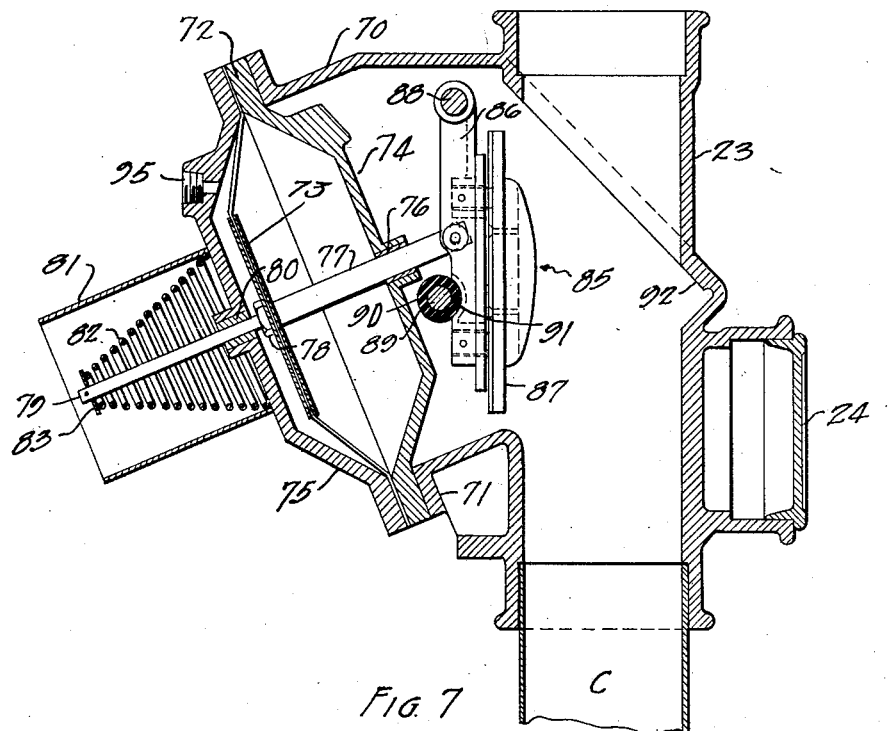

June 7, 1932.　　　C. S. JENNINGS　　　1,861,964
PNEUMATIC DISPATCH SYSTEM
Filed Aug. 2, 1930　　　6 Sheets-Sheet 5

INVENTOR
CHESTER S. JENNINGS
by Roberts, Cushman & Woodberry
ATT'YS

June 7, 1932.  C. S. JENNINGS  1,861,964

PNEUMATIC DISPATCH SYSTEM

Filed Aug. 2, 1930   6 Sheets—Sheet 6

INVENTOR
CHESTER S. JENNINGS
by Roberts Cushman & Woodberry
ATTYS

Patented June 7, 1932

1,861,964

UNITED STATES PATENT OFFICE

CHESTER S. JENNINGS, OF SYRACUSE, NEW YORK, ASSIGNOR TO THE LAMSON COMPANY, OF SYRACUSE, NEW YORK, A CORPORATION OF MASSACHUSETTS

PNEUMATIC DISPATCH SYSTEM

Application filed August 2, 1930. Serial No. 472,509.

This invention relates to an improvement in a pneumatic dispatch system more particularly in one of the single transit tube type.

The primary object of this invention is to provide means whereby the operator at one station can maintain control of the transit line and dispatch seriatim as many carriers as are ready, such means embodying interlocking valve units and control mechanism by which the valve units are operated.

A further object of the invention is to provide means whereby the interlocking valve units are operated by the air which impels the carriers through the tubes.

Other objects of the invention will appear from a consideration of the following specification wherein is set forth at length one embodiment of this invention and of the accompanying drawings wherein is illustrated such embodiment and in which, Fig. 1 is a diagrammatic view illustrating the general arrangement of the various elements;

Figs. 2 and 3 are side and front elevations of a station at which carriers are received and from which carriers may be dispatched;

Fig. 4 is a plan view of such station;

Fig. 5 is an enlarged side elevation of the valve units and control mechanism at the station which function when carriers are dispatched therefrom;

Fig. 6 is a sectional view illustrating one of the valve units;

Fig. 7 is a plan view of such unit;

Figure 8:
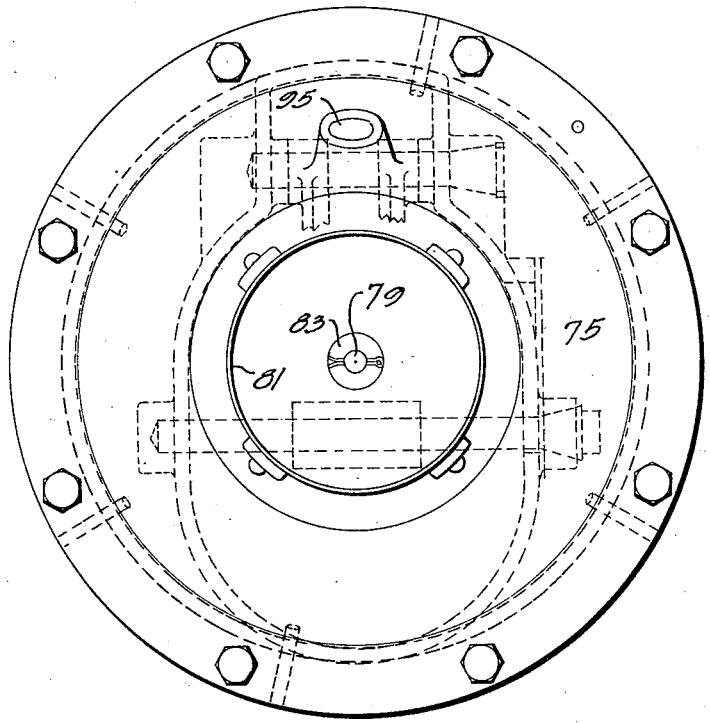
Fig. 8 is an elevation of the unit taken in the direction of the arrow 8 in Fig. 7.
Figure 9:
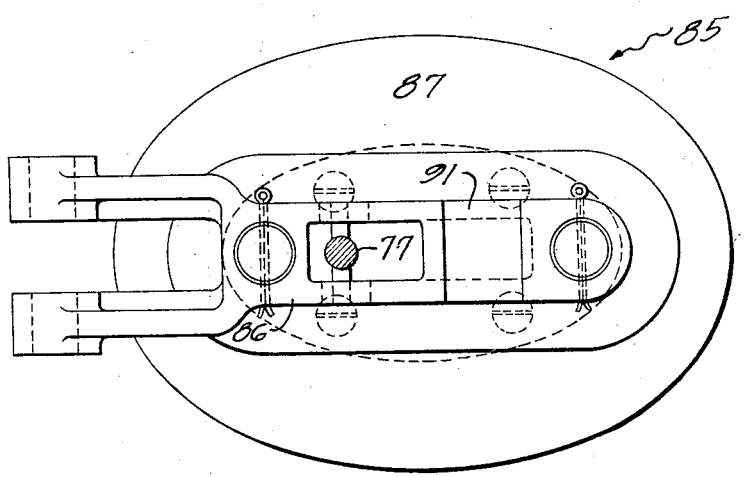
Fig. 9 is an elevation of the clapper valve in a valve unit.
Figure 13:
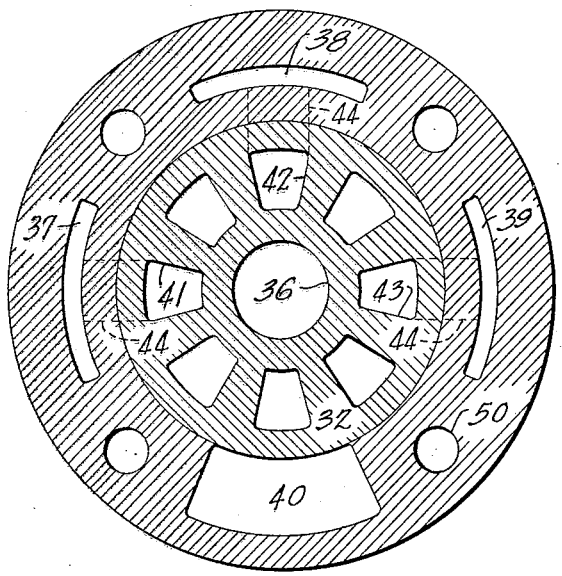
Fig. 13 is an enlarged sectional view taken along the line 13—13 of Fig. 10.
Figure 11:
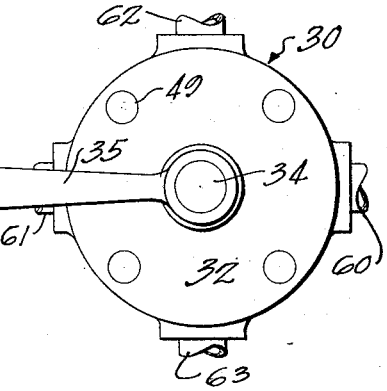
Figs. 10 and 11 are respectively a side elevation and a plan view of the control mechanism.

This invention is shown diagrammatically in Fig. 1 as applied to a pneumatic carrier system of the single transit tube type in which two receiving and dispatching stations A and B are connected by a single tube C. The carriers are dispatched from station A to station B and vice versa by the creation of positive air pressure supplied at station A by a tube D from a motor and blower assembly E and at station B by a tube D' from a motor and blower assembly E', and it will be understood that carriers can only be sent in one direction through the tube at any particular period. When the system is at rest the operator at station A, desiring to dispatch carriers to station B, closes the switch F through the starter G, actuating the motor and blower assembly E, and through the signal I indicating to the operator at station B that the system is in use for dispatching to that station. Under similar conditions the operator at station B closes the switch F' which through the starter G' actuates the motor and blower assembly E' and through the relay H' actuates the signal I'.

In connection with this mechanism, there is also provided a definite time relay J associated with the station A mechanism and a definite time relay J' associated with the station B mechanism. These various operating mechanisms will not be described herein in detail because they form no part of the present invention and are set forth at considerable length in the copending application of Jennings and McMarton, Serial No. 433,048, filed March 4, 1930, to which attention is respectfully directed for a detailed consideration of the mechanism and electrical mechanism herein shown. It will be understood therefore that such mechanisms are set forth herein for purposes of illstration only and that other mechanisms might be employed if desired without departing from the spirit and scope of the invention.

The feature with which I am particularly concerned is the provision of means by which a plurality of carriers can be sent seriatim from either of the stations A and B so that when an operator at one station obtains control of the line he can retain such control until all the carriers ready at the station have been dispatched.

The embodiments of this invention illustrated as at stations A and B, are identical and hence only that at station A will be described in detail with particular reference to Fig. 5 of the drawings. The air supply tube D enters the transit tube C by means of a suitable coupling 20 on the transit tube. Mounted on the transit tube at the coupling 20 is a valve unit 21, while a similar valve unit 22 is mounted on the transit tube C at a coupling 23. The coupling 23 is substantially the same as the coupling 20, the opening therein which corresponds to that through which the tube D enters coupling 20 being closed by a plug 24. Between the valve units 21 and 22 is provided a tube 25 hereinafter referred to as the lock section. The various elements above referred to are preferably enclosed within a cabinet 26 on which is supported a receiving terminal 27 of the usual curved type to which the carriers are delivered by the tube C from an opening 28 in the upper surface of the cabinet. Through the opening 28 carriers may be introduced into the tube when this station is used for dispatching. The cabinet as shown in Fig. 2 is provided with a plurality of pockets or recesses 29 in which carriers may be stored when desired.

Figure 12:
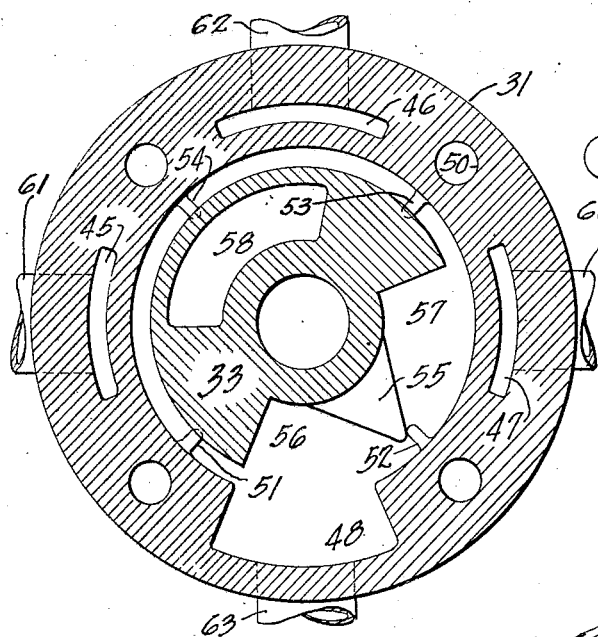
Fig. 12 is an enlarged sectional view taken along the line 12—12 of Fig. 10.
Figure 10:
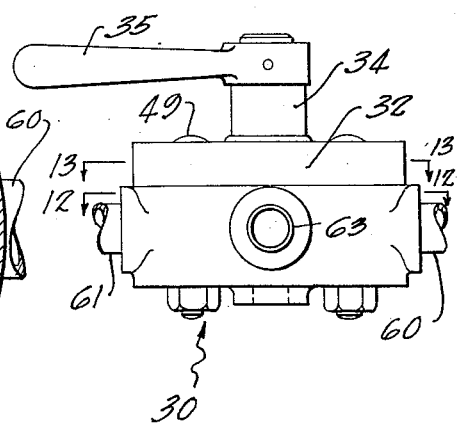

Mounted on the cabinet 26 is a control mechanism 30 shown in detail in Figs. 10 to 13 inclusive and comprising a ring 31 and a cap 32 mounted thereon. Within the opening of the ring 31 is mounted a rotatable disk fixed on a shaft 34 which extends through the cap 32 and is provided with a handle 35 through which the disk may be rotated as desired. In addition to the central opening 36 through which the shaft 34 passes, the cap 32 has in its periphery a plurality of arcuate slots 37, 38 and 39 and a pocket 40 also arcuate but of larger dimensions than the slots. The slots and pocket are closed at their upper ends and open at their lower ends. The cap is also provided with a plurality of recesses 41, 42 and 43 each of which recesses is connected by a channel 44, indicated by dotted lines in Fig. 13 to one of the slots above mentioned. It will be understood that the central element containing the opening 36 and the recesses 41, 42 and 43 is preferably made as a casting and has in addition to these particular recesses other recesses which have no outlets and which may be disregarded in the present description of the control mechanism. The ring 31 has therein a plurality of arcuate slots 45, 46 and 47 and an arcuate pocket 48. These slots and pocket are closed at their lower ends and open at their upper ends. It will be understood that the base 31 and the cap 32 are rigidly secured together by bolts 49, which pass through openings 50 in the cap and ring, with the slots 37, 38 and 39 and pocket 40 of the cap in alignment and direct communication with the slots 45, 46 and 47 and pocket 48 of the ring. The disk 33 of the control mechanism is, as shown in Fig. 12, spaced from the ring 31 and rests upon fingers 51, 52, 53 and 54 which project inwardly from the ring. A downwardly beveled tongue 55 of the disk 33 projects below the bottom surface of the member and will engage the fingers 51 or 52 to limit the movement of the member. The disk 33 is cut away at either side of the tongue 55 to provide spaces 56, 57 which are however in direct communication with each other due to the formation of the tongue. In the disk 33 is also provided an arcuate slot 58 closed at the bottom and open at the top for a purpose to be described later.

Leading from the ring 31 of the control member are a plurality of pipes 60, 61, 62 and 63. The pipe 60 connects the slot 47 to the valve unit 21; the pipe 61 connects the slot 45 to the valve unit 22; the pipe 62 connects the slot 46 to the atmosphere and the pipe 63 connects the pocket 48 to the air supply tube D as indicated in dotted lines on Fig. 1. The pipe 61 is also connected through a pipe 65 to the lock section 25 of the transit tube through an opening 66 in the coupling 23. The corresponding opening in the coupling 20 is permanently sealed by a plug 67 as shown in Fig. 5.

The valve units 21, 22 are identical in construction, and for the purpose of illustration I have elected to show the unit 22 in Figs. 6 to 9 inclusive. This unit is, as pointed out above, mounted on the coupling 23 which includes an annular projecting portion 70. Mounted on the flanged mouth 71 of the portion 70 is a housing 72 which contains a diaphragm 73. The housing comprises an inner plate 74 and an outer plate 75, and the diaphragm 73 is here shown clamped at its periphery between the edges of these portions. Mounted for reciprocation in a bearing 76 in the plate 74 is a stem 77 connected to the center of the diaphragm 73 by a nut 78. An extension 79 of the stem 77 passes through a bearing 80 in the plate 75 into a ring 81 mounted on the plate. Surrounding the extension 79 is a coil spring 82, the larger end of which bears against the outer surface of the plate 75 while the inner end bears against a cotter pin 83 passed through the extension 79.

Pivotally connected to the inner end of the stem 77 is a valve 85 here shown as comprising an arm 86 to which is secured a clapper valve 87. The arm 86 is pivoted at one end on a shaft 88 and its opening movement is stopped by a rod 89, preferably provided with a rubber covering 90 which enters a notch 91 formed in the arm 86. The clapper valve 87 when closed bears against an inclined seat 92 provided in the coupling 23 and in that position stops the flow of air upwardly through the transit tube C and also prevents the entry of a carrier into such tube. The clapper valve is normally open as shown in Fig. 6 under the action of the spring 82 in which position the diaphragm 73 is drawn out of its normal plane. When so located the valve 85 will not interfere with the passage of carriers through the tube C. The pipe 61 is connected to the diaphragm housing 72 through an inlet 95 in the plate 75, while the pipe 60 is connected through an inlet 96 in the corresponding portion of the valve unit 21. Since the valve unit 21 corresponds in every other respect to the unit 22 just described in detail, the same reference characters will be applied thereto.

The operation of the control member and valve units in connection with the dispatch of carriers from the station A selected for illustration will now be described. The disk 33 of the control mechanism 30 is in the position shown in full lines in Fig. 12, and the valves 85 of both valve units are open so that free passage of carriers through the transit tube is permitted. When the operator wishes to dispatch one or more carriers, the transit tube C being clear, a carrier is dropped into the tube through the opening 28, which carrier will travel by gravity past the valve units 21 and 22, the switch F is closed and the disk 33 is shifted to bring the tongue 55 into engagement with the finger 52. The closure of the switch F causes air to be forced from the supply tube D into the transit tube C and at the same time to be forced through the pipe 63 into the pocket 48 of the ring 31, filling the spaces 56, 57 of the disk and passing from the space 56 through the recess 41, channel 44, slots 37 and 45 into the tube 61 and thence into the diaphragm housing 72 of the upper unit valve 22. The pressure thus created acts against the diaphragm 73 and forces the closure of the clapper valve 87 against the urge of the spring 82 so that the air is forced into the tube C and the carrier therein is advanced to station B. When the disk 33 of the control mechanism is in this position, the pipe 60 leading to the valve unit 21 will be connected through the slots 47 and 39, channel 44, slots 38 and 46 to the pipe 62 and thus to the atmosphere so that the clapper valve 87 of that valve unit will remain in the open position. The pipe 65 by which the lock section 25 is directly connected to the unit 22 also admits air under pressure to the diaphragm housing 72 and further insures closure of the valve 85 of that unit.

If it be desired to send a second carrier through the transit tube C while the first carrier is still in transit to station B, the disk 33 is shifted into the position shown in full lines in Fig. 12, in which position the air entering from the tube D through the pipe 63 will pass to the pipe 60 through the space 57, recess 43, channel 44, and slots 39 and 47 and thence to the valve unit 21, causing the closure of its valve 85. At the same time the pipe 61 leading to the valve unit 22 will be connected to the pipe 62 leading to the atmosphere through the slots 45, 37, channel 44, recess 41, slot 58, the recess 42, channel 44, and slots 38, 46 allowing the spring 82 to open the valve 85 in that unit. The carrier is then introduced through the opening 28 and drops onto the clapper 87 of the lower unit. The position of the disk 33 is then shifted, closing the valve 85 of the upper unit and opening the valve of the lower unit so that the carrier can pass on through the tube to station B.

It will be understood that the operator may dispatch as many carriers as are ready by repeating the operations above described. It will also be understood when the last carrier dispatched from station A has reached station B, the pressure of air in the supply tube is cut off through the action of the definite time relay J, whereupon both the valve units 21 and 22 at station A will resume their normal position and the signal I at station B is made inoperative so that the operator there will know that the line is free and can be used for dispatching to station A if desired.

While one embodiment only of this invention has been described herein, it will be understood that the invention is not limited thereto and that other embodiments may be made without departing from the spirit and scope thereof as set forth in the following claims.

I claim:

1. In a pneumatic carrier system of the single transit tube type, a station comprising a pair of valve units spaced along the transit tube, a tube through which air is supplied to the transit tube to cause carriers to travel away from said station, and connections between said air supply tube and said units through which the units are actuated by the air, whereby a plurality of carriers may be fed seriatim to the transit tube.

2. In a pneumatic carrier system of the single transit tube type, a station comprising a pair of valve units spaced along the transit tube, a tube through which air is supplied to the transit tube to cause carriers to travel away from said station, and connections between said air supply tube and said units through which the units are actuated by the air, said connections including a control mechanism which directs the air to a selected unit.

3. In a pneumatic carrier system of the single transit tube type, a station comprising a pair of valve units spaced along the transit tube, a tube through which air is supplied to the transit tube to cause carriers to travel away from said station, and connections between said air supply tube and said units through which the units are actuated by the air, said connections including a control mechanism having a movable element, which in one position directs the air to one unit and in another position directs the air to the other unit.

4. In a pneumatic carrier system of the single transit tube type, a station comprising a pair of valve units spaced along the transit tube, a tube through which air is supplied to the transit tube to cause carriers to travel away from said station, and connections between said air supply tube and said units through which the units are actuated by the air, each unit including a valve, and a spring, and means for closing the valve of a selected unit against the tension of its spring, and simultaneously permitting the opening of the other unit by the action of its spring.

5. In a pneumatic carrier system of the single transit tube type, a station comprising a pair of valve units spaced along the transit tube, a tube through which air is supplied to the transit tube to cause carriers to travel away from said station, and connections between said air supply tube and said units through which the units are actuated by the air, each unit including a valve, a diaphragm, and a spring and connections between the transit tube and the valve units, through which connections air flows from the transit tube, acting upon the diaphragm of a selected unit and causing the closing of the valve thereof against the urge of the spring, and simultaneously permitting the opening of the valve of the other unit by the action of its spring.

6. In a pneumatic carrier system of the single transit tube type, a station comprising a pair of valve units spaced along the transit tube, a tube through which air is supplied to the transit tube to cause carriers to travel away from said station, connections between said air supply tube and said units, said connections including a control mechanism, the air in the connections in one position of such mechanism closing one of said valve units, and means for shifting said mechanism whereby the air closes the other valve unit, while permitting the first-named unit to open.

7. In a pneumatic carrier system of the single transit tube type, a station comprising a pair of valve units spaced along the transit tube, a tube through which air is supplied to the transit tube to cause carriers to travel away from said station, connections between said air supply tube and said units, both said units being normally open to permit the free travel of carriers in the transit tube, and one unit being closed while the other remains open, when air pressure is created in the air supply tube.

8. In a pneumatic carrier system of the single transit tube type, a station comprising a pair of valve units spaced along the transit tube, a tube through which air is supplied to the transit tube to cause carriers to travel away from said station, connections between said air supply tube and said units, said connections including a control mechanism, both said units being normally open to permit the free travel of carriers in the transit tube, and upon the creation of pressure in the air supply tube one of said units is closed while the other remains open, and means to shift said mechanism whereby the second-named unit is closed and the first-named unit is permitted to open.

9. In a pneumatic carrier system of the single transit tube type, a station comprising a pair of valve units spaced along the transit tube, a tube through which air is supplied to the transit tube to cause carriers to travel away from said station, connections between said air supply tube and said units, said connections including a control mechanism, a pipe connecting said control mechanism to the transit tube between said valve units, and means to shift said mechanism to close one unit and permit the other unit to open.

10. In a pneumatic carrier system of the single transit tube type wherein the carriers may travel in either direction, a station in said system comprising a pair of valve units spaced along the transit tube, each unit comprising a valve, a spring by which the valve is normally open, and a diaphragm which occupies its normal position when the valve is closed, a tube through which air is supplied to the transit tube to cause carriers to travel away from said station, and a connection from the air supply tube to the valve units through which air will flow when the station is used as a dispatching station, said connection including a control mechanism having movable means for directing the air to a selected unit and thereby acting upon the diaphragm and closing the valve thereof against the urge of the spring.

Signed by me at Syracuse, New York, this thirty-first day of July, 1930.

CHESTER S. JENNINGS.